No. 788,586. PATENTED MAY 2, 1905.
H. A. MANN.
EXPANSIVE AND CONTRACTIVE PULLEY.
APPLICATION FILED FEB. 10, 1904.

Witnesses:
Inventor:
Henry A. Mann

No. 788,586.

Patented May 2, 1905.

UNITED STATES PATENT OFFICE.

HENRY A. MANN, OF BOYNE, MICHIGAN, ASSIGNOR OF ONE-HALF TO ERVAN A. RUEGSEGGER, OF BOYNE, MICHIGAN.

EXPANSIVE AND CONTRACTIVE PULLEY.

SPECIFICATION forming part of Letters Patent No. 788,586, dated May 2, 1905.

Application filed February 10, 1904. Serial No. 193,026.

*To all whom it may concern:*

Be it known that I, HENRY A. MANN, a citizen of the United States, residing at Boyne, in the county of Charlevoix and State of Michigan, have invented a new and useful Expansive and Contractive Pulley or Band Wheel, of which the following is a specification.

My invention relates to an improvement in pulley or band wheels; and the objects of my improvement are, first, a wheel the diameter and circumference of which may be increased or diminished at will and at the same time retain a continuous and perfect rim; second, a wheel the corresponding parts of which are interchangeable, and, third, to attain the above objects and retain the advantages of the well-known split pulley. I attain these objects by the mechanism illustrated in the accompanying drawings, in which—

Figure 1:
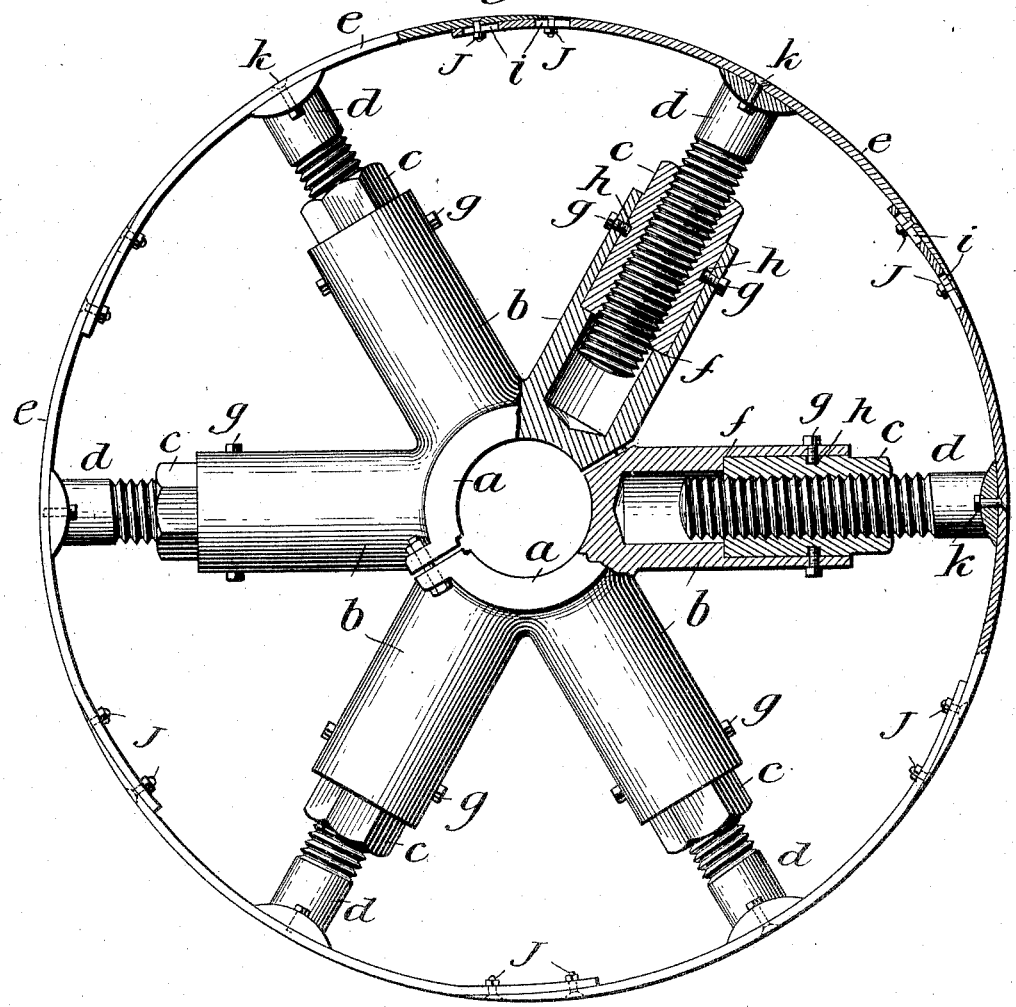
Figure 2:
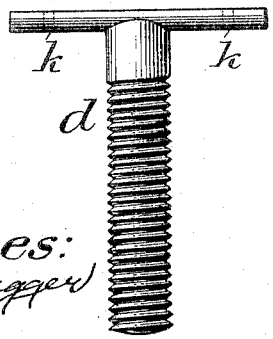
Figure 3:
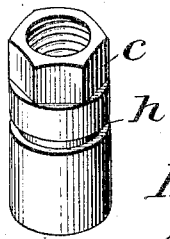

Figure 1 is a view of the wheel with the different parts assembled in place, including a sectional view of one of the spokes A. Fig. 2 is a view of a T-shaped outer spoke detached. Fig. 3 is a view, imperfect, of a socket-nut $c$.

Similar letters refer to similar parts in the different views.

The different parts are the hub proper, $a$, hub-spokes $b$, working socket-nut $c$, T-shaped outer spoke $d$, and sectional slotted rim $e$, together with suitable bolts and set-screws, as set forth in the illustration. Each sectional hub $a$ and its hub-spokes $b$ are integral pieces; but the hub-spokes are hollow from the outer end nearly to the shaft-hole in the hub. Inside the hollow hub-spoke $b$ is set the socket-nut $c$, which rests against the shoulder $f$ and is retained and fastened by set-screws $g\ g$, which set in the groove $h$, which runs around the nut $c$. This nut $c$ is cylindrical in form except where it projects out from the hub-spoke $b$. This projection is squared for the purpose of turning. The outer spoke $d$ is threaded on its inner end and works in the socket-nut $c$. The cross portion of outer spoke $d$ is perforated for bolts or rivets, by means of which it may be securely fastened to the rim.

The sectional slotted rim $e$ is of flexible metal suitably curved and tapered at one end, where it laps over the next section. The tapered end of the sectional rim $e$ has bolt-holes at J, bored for countersunk heads, and the other end or under lap of the section has longitudinal slots $i$, through which bolts having threads and nuts from the outer lap extend, allowing the lap of the sectional rim to increase or diminish as its circumference is respectively diminished or increased. These sectional rims $e$ also have holes $k$, whereby the rim is securely fastened to the cross portion of the outer spoke $d$.

To change the diameter of the wheel, simply loosen the rim-bolts J and the set-screws $g$ and turn the socket-nut $c$ to lengthen or shorten the spokes, as desired, and again tighten the set-screws $g$ and rim-bolts J.

The hub of this wheel is divided and fitted with proper bolts and nuts, as is usual with split pulleys. I do not, therefore, claim this particular as my improvement; but What I do claim as my invention, and desire to secure by Letters Patent, is—

An expansible pulley having extensible spokes, and comprising a hub having hollow spoke portions with shoulders thereon, a socket-nut in each spoke portion resting on the shoulder, said nut being provided with a peripheral groove, set-screws engaging said groove, a T-shaped outer spoke portion having threaded engagement with each socket-nut, rim-sections having tapered overlapping ends, the outer lap portion being perforated for bolts having countersunk heads, and the under lap portion being slotted, and bolts therefor.

In testimony whereof I have signed my name to this specification in the presence of two subscribing witnesses.

HENRY A. MANN.

In presence of—
GEORGE H. JACKSON,
WM. L. MARTIN.